US010956317B2

(12) United States Patent
Pletka et al.

(10) Patent No.: US 10,956,317 B2
(45) Date of Patent: Mar. 23, 2021

(54) GARBAGE COLLECTION IN NON-VOLATILE MEMORY THAT FULLY PROGRAMS DEPENDENT LAYERS IN A TARGET BLOCK

(71) Applicant: INTERNATIONAL BUSINESS MACHINES CORPORATION, Armonk, NY (US)

(72) Inventors: Roman A. Pletka, Uster (CH); Nikolaos Papandreou, Thalwil (CH); Sasa Tomic, Kilchberg (CH); Nikolas Ioannou, Zurich (CH); Aaron D. Fry, Richmond, TX (US); Timothy Fisher, Cypress, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/272,665

(22) Filed: Feb. 11, 2019

(65) Prior Publication Data

US 2020/0257621 A1    Aug. 13, 2020

(51) Int. Cl.
| | |
|---|---|
| G06F 12/00 | (2006.01) |
| G06F 13/00 | (2006.01) |
| G06F 13/28 | (2006.01) |
| G06F 12/02 | (2006.01) |
| G06F 3/06 | (2006.01) |

(52) U.S. Cl.
CPC ........ *G06F 12/0253* (2013.01); *G06F 3/0608* (2013.01); *G06F 3/0647* (2013.01); *G06F 3/0652* (2013.01); *G06F 3/0679* (2013.01); *G06F 12/0246* (2013.01); *G06F 2212/7205* (2013.01)

(58) Field of Classification Search
CPC .......................... G06F 3/0647; G06F 12/0253
USPC ....................................................... 711/103
See application file for complete search history.

(56) References Cited

U.S. PATENT DOCUMENTS

| | | | |
|---|---|---|---|
| 9,361,221 B1 | 6/2016 | Kankani et al. | |
| 9,652,381 B2 | 5/2017 | Higgins et al. | |
| 10,014,060 B2 | 7/2018 | Tuers et al. | |
| 2004/0210706 A1* | 10/2004 | In ........................ | G06F 12/0246 |
| | | | 711/103 |

(Continued)

OTHER PUBLICATIONS

Cheadle, A.; Soft Real-time Garbage Collection for Dynamic Dispatch Languages, 2017.

(Continued)

*Primary Examiner* — Edward J Dudek, Jr.
*Assistant Examiner* — Sidney Li
(74) *Attorney, Agent, or Firm* — Stosch Sabo; Brian F. Russell

(57) ABSTRACT

A non-volatile memory includes a plurality of blocks of physical memory, including a target block and at least one source block containing at least some valid data and some invalid data. Responsive to determining to perform garbage collection for the non-volatile memory, the controller transfers valid data from the at least one source block to the target block. The controller ends garbage collection on the at least one source block with at least some valid data present in the at least one source block and all interfaces of the target block closed at the boundary of independent layers. In at least some embodiments, the target block may be configured to store more bits per cell than the at least one source block.

16 Claims, 7 Drawing Sheets

(56) References Cited

U.S. PATENT DOCUMENTS

2016/0148694 A1    5/2016  Chang et al.
2016/0299689 A1*  10/2016  Kim ........................ G06F 3/061
2018/0276118 A1*   9/2018  Yanagida ................ G06F 3/064

OTHER PUBLICATIONS

Kang, D. et al.; Amnesic Cache Management for Non-Volatile Memory, 2015.

Mittal, S. et al.; A Survey of Techniques for Improving Security of Non-Volatile Memories, 2018.

Anonymously; Reducing Memory Management Activity in a Virtual Machine through the Use of Internet Object Pools, IP.com No. IPCOM000251646D, Nov. 21, 2017.

Anonymously; Method for Better Performance by Smart Garbage Collector Invocation on SSD in High Reliability Environment, IP.com No. IPCOM000223784D, Nov. 29, 2012.

Anonymously; An Application Level, Non-Volatile Memory Management Mechanism, IP.com No. IPCOM000146570D, Feb. 16, 2007.

Hong et al.; NAND Flash-based Disk Cache Using SLC/MLC Combined Flash Memory, IEEE 2010.

Jimenez et al.; Phoenix: Reviving MLC Blocks as SLC to Extend NAND Flash Devices Lifetime, EDAA 2013.

Geoff Gasior, Samsung's 840 EVO solid-state drive reviewed TLC NAND with a shot of SLC cache, Jul. 25, 2013 URL: https://techreport.com/review/25122/samsungs-840-evo-solid-state-drive-reviewed/.

Geoff Gasior, Micron's M600 SSD accelerates writes with dynamic SLC cache, Sep. 16, 2014 URL: Micron's M600 SSD accelerates writes with dynamic SLC cache.

* cited by examiner

Fig. 2B — 204

| L | WL 0 LP | WL 0 UP | WL 0 XP | WL 1 LP | WL 1 UP | WL 1 XP | ... | WL m-1 LP | WL m-1 UP | WL m-1 XP |
|---|---|---|---|---|---|---|---|---|---|---|
| L 0 | 0 | $2m$ | $2m+1$ | 1 | $2m+3$ | $2m+4$ | ... | $m-1$ | $5m-3$ | $5m-2$ |
| L 1 | $m$ | $5m$ | $5m+1$ | $m+1$ | $5m+3$ | $5m+4$ | ... | $2m-1$ | $8m-3$ | $8m-2$ |
| L 2 | $2m+2$ | | | $2m+5$ | | | ... | $5m-1$ | | |
| L 3 | $5m+2$ | | | $5m+5$ | | | ... | $8m-1$ | | |
| ... | ... | ... | ... | ... | ... | ... | ... | ... | ... | ... |
| L n-1 | $x-1$ | $x+6m-3$ | $x+6m-2$ | $x$ | $x+6m$ | $x+6m+1$ | ... | $x+3m-4$ | $x+9m-2$ | $x+9m-1$ |
| L d | $x+3m-1$ | | | $x+3m-2$ | | | *unused illustration* | $x+6m-4$ | | |
| L n | $x+6m-1$ | | | $x+6m-2$ | | | ... | $x+9m-4$ | | |
| L n+1 | | | | | | | ... | | | |
| L n+2 | | | | | | | ... | | | |
| ... | ... | ... | ... | ... | ... | ... | ... | ... | ... | ... |
| L 2n-1 | | | | | | | ... | | | |

GARBAGE COLLECTION IN NON-VOLATILE MEMORY THAT FULLY PROGRAMS DEPENDENT LAYERS IN A TARGET BLOCK

BACKGROUND OF THE INVENTION

This disclosure relates to data processing and data storage, and more specifically, to garbage collection in a non-volatile memory system. Still more particularly, the disclosure relates to techniques for garbage collection in a non-volatile memory system that fully program dependent layers in a target block.

NAND flash memory is an electrically programmable and erasable non-volatile memory technology that stores one or more bits of data per memory cell as a charge on the floating gate of a transistor or a similar charge trap structure. The amount of charge on the floating gate modulates the threshold voltage of the transistor. By applying a proper read voltage and measuring the amount of current, the programmed threshold voltage of the memory cell can be determined and thus the stored information can be detected. Memories storing one, two, three and four bits per cell are respectively referred to in the art as Single Level Cell (SLC), Multi-Level Cell (MLC), Three Level Cell (TLC), and Quad Level Cell (QLC) memories.

In a typical implementation, a NAND flash memory array is organized in physical blocks (also referred to as "erase blocks") of physical memory, each of which includes multiple physical pages each in turn containing a multiplicity of memory cells. By virtue of the arrangement of the word and bit lines utilized to access memory cells, flash memory arrays have generally been programmed on a physical page basis, but erased on a physical block basis. Blocks must be erased prior to being programmed.

Over time, various ones of the logical pages of data programmed into a physical block of a NAND flash memory array will be overwritten, for example, by write operations to the logical addresses of the logical pages, or invalidated, for example by trim operations. The overwrites and invalidations of these logical pages leads to data fragmentation and the inability to use the storage capacity associated with the invalidated physical space until the physical block is again erased and reprogrammed. This reduction in available storage capacity, if not managed appropriately, can in turn reduce overprovisioning and undesirably increase write amplification. In order to recover the use of the storage capacity associated with invalidated logical pages, a conventional flash controller regularly performs "garbage collection," which includes the controller collecting the still valid logical pages from one or more fragmented blocks, programming an available erased block with the valid logical pages, erasing the fragmented block(s), and then recording the newly erased blocks in a free block queue in preparation for re-use.

In prior art systems, garbage collection is interrupted after all remaining valid logical data pages in a block or block stripe (logical erase block) have been relocated from one or more source blocks and enough blocks have been freed up such that the count of free (erased) blocks in a free block queue satisfies a threshold. The garbage collection stop condition is therefore determined by the fill level of the free block queue and the complete relocation of all valid data from the source block(s). The present disclosure recognizes that this garbage collection policy can undesirably increase the bit error rates of target blocks written during the garbage collection process.

BRIEF SUMMARY

In succeeding generations of NAND flash storage, a significant increase in storage density has been achieved by increasing the number of bits stored per cell and by vertically stacking additional layers of cells. This desirable trend of increasing storage density has unfortunately led to reductions in the reliability, endurance, and latency of NAND flash memory. In particular, increasing the number of bits stored per cell reduces the margins between voltage levels representing different data values and requires the threshold voltage distributions of each level to contract. Hence, newer generations of NAND flash memory exhibit increased sensitivity to errors induced by data retention, program disturb and read disturb effects, and over-programming effects. In order to reduce the bit error rate contribution due to these effects to an acceptable level, read threshold voltage calibration, in which the read threshold voltage for one or more pages is shifted positively or negatively, is commonly employed.

To reduce the volume of read threshold voltage calibration metadata that is maintained, read threshold voltage shift values are commonly maintained for groups of pages sharing similar characteristics. In some implementations, the read threshold voltage shift values are determined based on multiple pages in the page group, for example, utilizing some form of averaging. Due to the presence of short term data retention effects, blocks that experience significant pauses between page programming operations will have substantially different optimal read threshold voltage shift values. Consequently, if pages of the same page group have different retention times, all pages in the page group will likely experience sub-optimal read threshold voltage calibration (and a higher bit error rate). In other implementations in which only a subset of pages or a single page of the page group is used for read threshold voltage calibration, any page of the same page group having a different data retention time than the page(s) used for read threshold voltage calibration will experience a significantly higher bit error rate. In both implementations of read threshold voltage calibration for page groups, the resulting bit error rate for a page may be greater than can be corrected via error correcting code (ECC). Consequently, a read retry or error recovery procedure may be required to read the data of the page, resulting in a significant increase in read latency and/or an uncorrectable read error.

Another phenomenon that has been observed in NAND flash memory employing multi-bit cells (e.g., MLC, TLC, and/or QLC) is an increase in the bit error rate in pages having an "open interface," that is, pages for which adjacent word lines and/or word-layers have not been programmed yet, for example, as result of a vendor-specific page programming order. Even though pages are generally programmed sequentially in a block, shared pages, i.e. physical pages on the same word line, are often not programmed immediately one after the other because several word lines are typically interleaved. Therefore, a programming pause can leave several word lines of a block open (i.e., such that those word lines have one or more unprogrammed pages and one or more programmed pages). To ensure that valid data can be read successfully, unprogrammed pages on an open word line can be programmed with synthetic data after a timeout expires. This process is known as "closing the interface" or "flushing" the block. When read threshold voltage shift values are grouped together for all word lines on the same layer or a group of adjacent layers, closing the interfaces avoids sub-optimal read threshold voltages due to phenomena such as short-term retention or unequal retention characteristics between word-lines of a group that were not programmed at the same time or unequal threshold voltages characteristics between word lines of a group where some of the word lines have closed interfaces and others have open interfaces. However, because some word lines will remain partially programmed with synthetic data, writes to these word lines after the programming pause will still result in cell-to-cell interference to the previously programmed layer. When read threshold voltage shift values are grouped together for several layers, such a read pause between layers in the same group will still result in sub-optimal read threshold voltage calibration even if the interfaces have been closed by writing synthetic data. Further, programming of synthetic data—especially if done frequently—wastes storage capacity, artificially reduces the overprovisioning, and thereby increases write amplification. While it is preferable to ensure all dependent layers are programmed within a short amount of time, it is further preferable, if possible, to avoid closing the interface of a block utilizing synthetic data.

In accordance with at least one embodiment, a controller of a non-volatile memory promotes improved read threshold voltage calibration by fully programming a dependent layer in a target block written during garbage collection and thus avoiding leaving an open interface. In one exemplary embodiment, a non-volatile memory includes a plurality of blocks of physical memory, including a target block and at least one source block containing at least some valid data and some invalid data. Responsive to determining to perform garbage collection for the non-volatile memory, the controller transfers valid data from the at least one source block to the target block. The controller ends garbage collection on the at least one source block with at least some valid data present in the at least one source block and all interfaces of the target block closed at the boundary of independent layers. In at least some embodiments, the target block may be configured to store more bits per cell than the at least one source block.

BRIEF DESCRIPTION OF THE SEVERAL VIEWS OF THE DRAWINGS

FIG. 2B depicts an internal architecture of a physical block in an exemplary flash memory module in accordance with one embodiment.

DETAILED DESCRIPTION

Figure 1A:
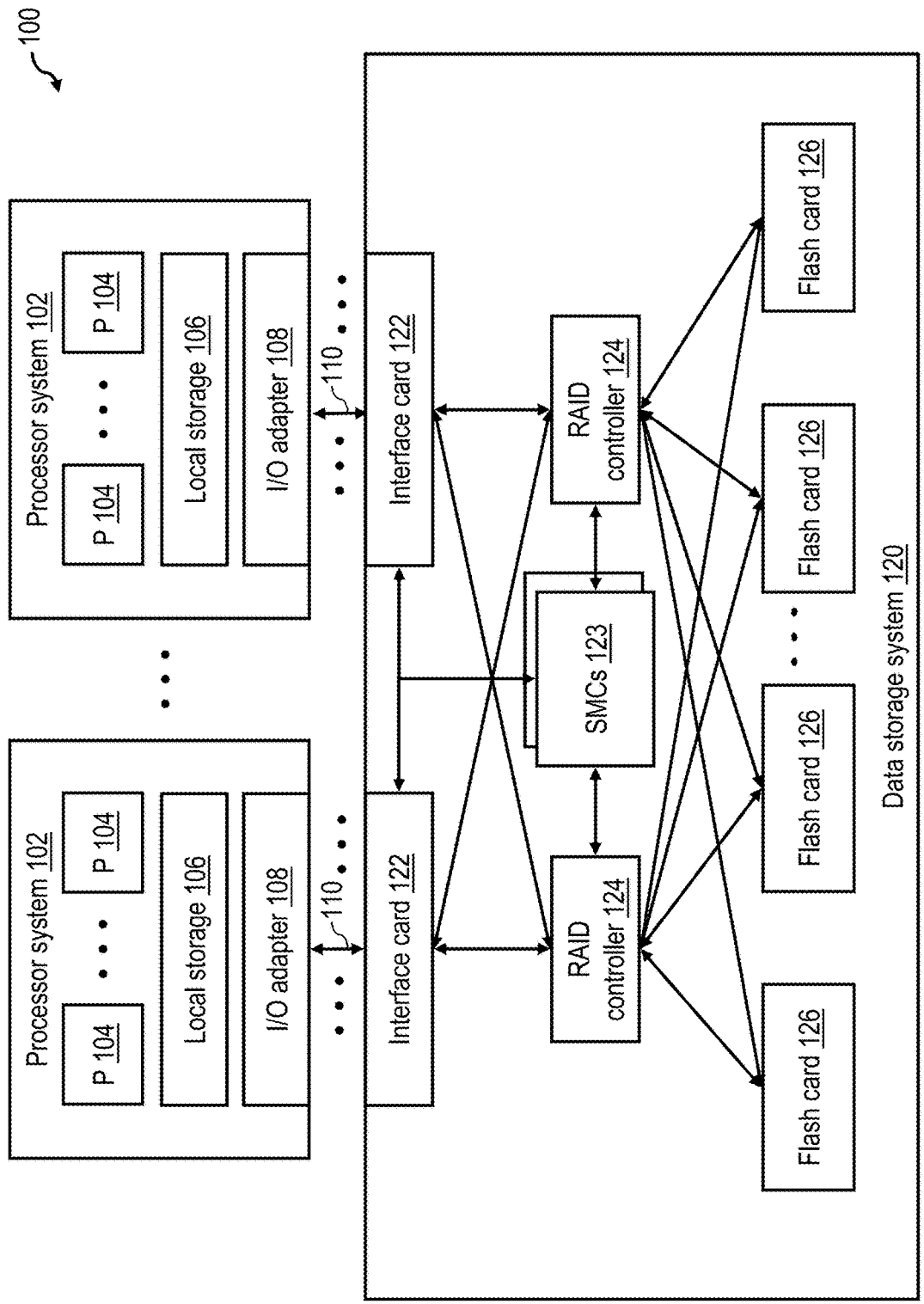
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. A processor system 102 may additionally include local storage 106 (e.g., dynamic random access memory (DRAM) or disks) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, POWER, Intel x86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In some embodiments, data storage system 120 may be integral to a processor system 102. In various embodiments, I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O requests communicated via I/O channel 110 include host read requests by which a processor system 102 requests data from data storage system 120 and host write requests by which a processor system 102 requests storage of data in data storage system 120.

Although not required, in the illustrated embodiment, data storage system 120 includes multiple interface cards 122 through which data storage system 120 receives and responds to I/O requests of hosts via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to non-volatile storage media, which in the illustrated example include multiple flash cards 126 bearing NAND flash memory. In other embodiments, alternative and/or additional non-volatile storage devices can be employed.

In the depicted embodiment, the operation of data storage system 120 is managed by redundant system management controllers (SMCs) 123, which are coupled to interface cards 122 and RAID controllers 124. In various embodiments, system management controller 123 can be implemented utilizing hardware or hardware executing firmware and/or software.

Figure 1B:
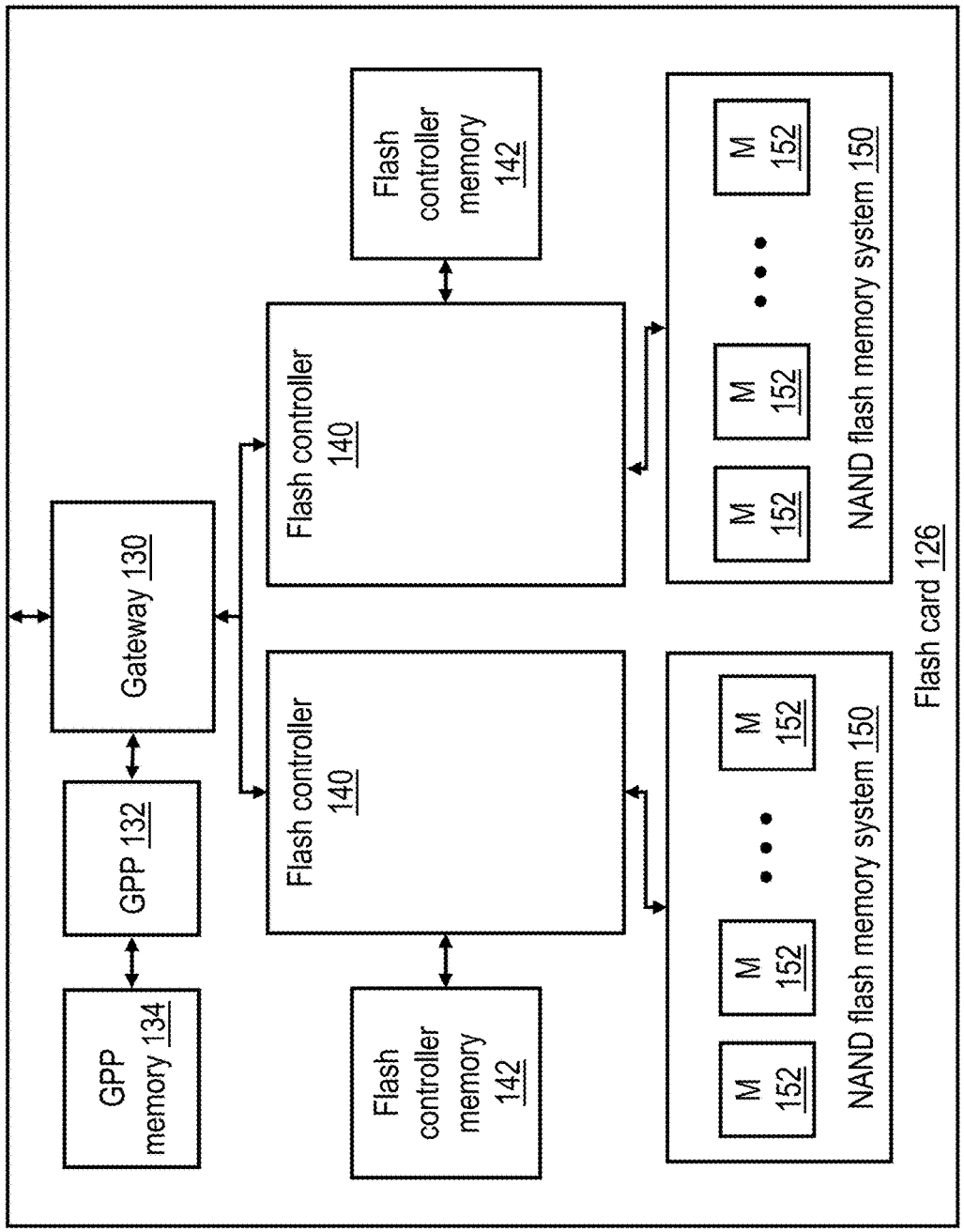
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on requests received by gateway 130 and/or to schedule servicing of the requests by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or a Field Programmable Gate Array (FPGA) and/or a microprocessor, and each have an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive host read and write requests from gateway 130 that request to read data stored in NAND flash memory system 150 and/or to store data in NAND flash memory system 150. Flash controllers 140 service these requests, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. In general, a request received by flash controller 140 from a host device, such as a processor system 102, contains the logical block address (LBA) at which the data is to be accessed (read or written) and, if a write request, the write data to be stored to data storage system 120. The request may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of a board-mounted flash memory modules, for example, Single Level Cell (SLC), Multi-Level Cell (MLC), Three Level Cell (TLC), and/or Quad Level Cell (QLC) NAND flash memory modules. In preferred embodiments, flash controllers 140 can operate a hybrid memory system in which blocks of memory are configured to operate with different bit-per-cell storage capacities. For example, in one embodiment, a first pool of blocks contains blocks configured with a lower per-cell bit count (e.g., SLC), and a second pool of blocks contains blocks configured with a higher per-cell bit count (e.g., as QLC, TLC, or MLC). The blocks in the first pool have significantly lower read latency, higher write throughput, and reduced wear, while blocks in the second pool have significantly greater storage density. In at least some embodiments, flash controllers 140 are configured to adapt the sizes of the two block pools to the current utilization of the device.

Figure 2A:
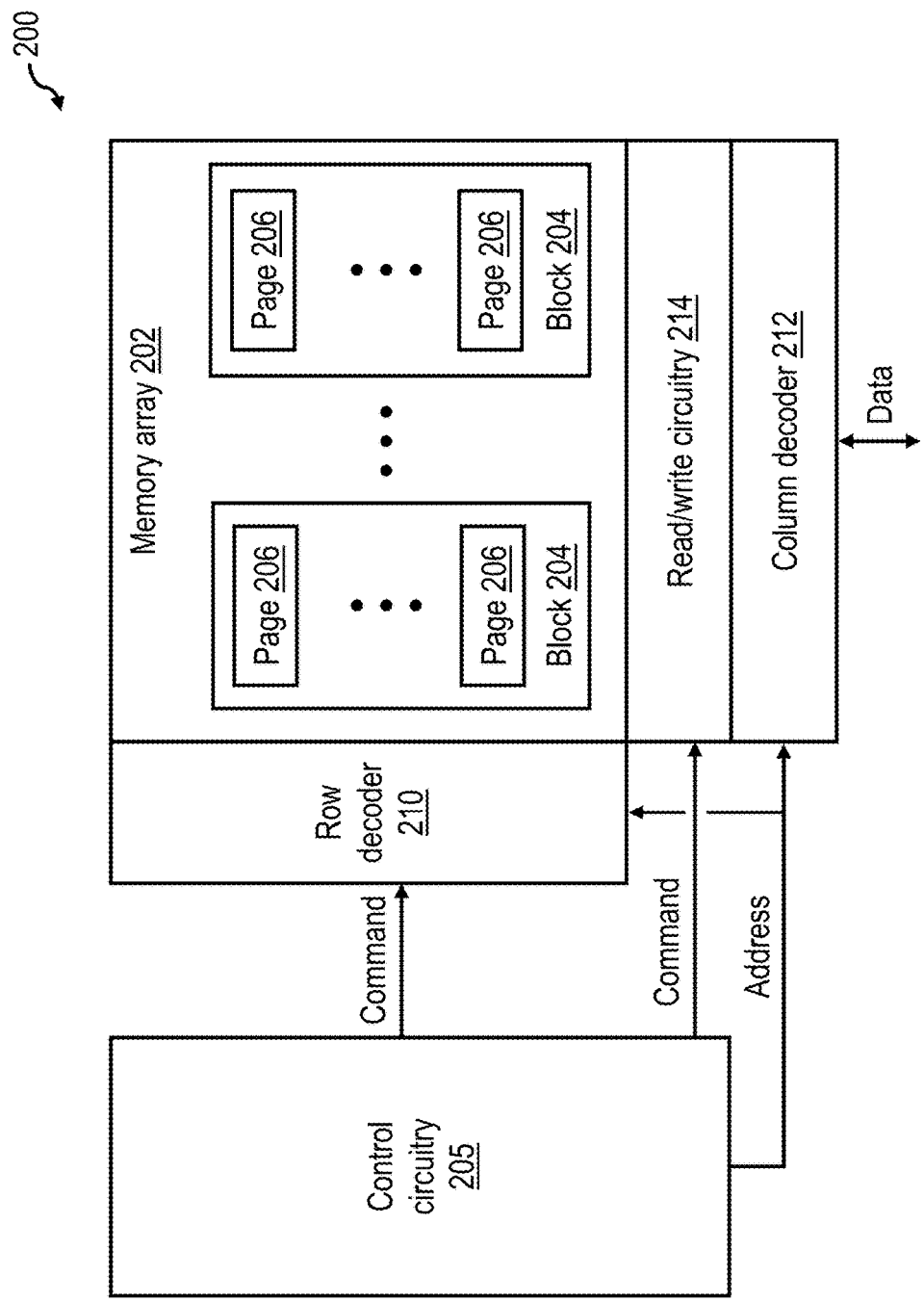
FIG. 2A depicts an exemplary NAND flash memory module in accordance with one embodiment.

Referring now to FIG. 2A, there is depicted a block diagram of an exemplary flash memory module 200 that can be utilized to implement any of the NAND flash memory storage devices 152 of FIG. 1B. Flash memory module 200 includes one or more memory die, each implementing at least one memory array 202 formed of a two-dimensional or three-dimensional array of NAND flash memory cells. As indicated in FIG. 2A, the memory cells within memory array 202 are physically arranged in multiple blocks 204, each in turn including multiple physical pages 206. These physical pages can be managed in page groups, which can each be formed, for example, of all the pages coupled to a common wordline, of all pages in one or more layers in a 3D NAND flash, of a set of pages in one or more layers, or generally of pages with similar characteristics.

As is known to those skilled in the art, NAND flash memory, such as that employed in memory array 202, must be erased prior to being programmed. Further, NAND flash memory can be (but is not required to be) constrained by its construction such that the smallest granule of storage that can be erased is a block 204 and the smallest granule of storage that can be accessed by a read or write request is fixed at the size of a single physical page 206. It should be appreciated in this regard that the LBAs provided by host devices correspond to logical pages within a logical address space, where each logical page typically has a size of 4 kilobytes (kB). Physical pages 206, in contrast, typically have a larger size, for example, 16 kB, and can thus store multiple logical pages.

Flash memory module 200 further includes a row decoder 210 through which word lines of memory array 202 can be addressed and a column decoder 212 through which bit lines of memory array 202 can be addressed. In addition, flash memory module 200 includes read/write circuitry 214 that enables the memory cells of a physical page 206 to be programmed or read in parallel. Flash controller 200 additionally includes control circuitry 205 that provides chip-level control of operation of memory array 202, including read and write accesses made to physical pages 206 in memory array 202, erasure of blocks 204, and the amplitude, duration and polarity of related voltages applied to memory array 202.

Referring now to FIG. 2B, there is depicted an exemplary architecture of a block 204 in an exemplary flash memory module 200. The block 204 includes m word lines (WL0 to WLm−1), 2n data layers (L0 to L2n−1) all used for storing data, and one or more dummy layers (Ld) which are not used to store data. FIG. 2B further illustrates the exemplary programming sequence of pages in the block. In this example, programming of block 204 starts with the lower page LP on word line WL0 in layer L0 (sequence index 0). Next, all lower pages of the remaining word lines in layer L0 are programmed (sequence indices 1 to m−1). The programming sequence continues with the lower pages in the next layer L1 (sequence indices m to 2m−1). Once all lower pages of the first two layers are programmed, the sequence continues with programming upper and extra pages of the first layer L0 interleaved with the lower pages of layer L2 (sequence indices 2m, 2m+1, 2m+2, 2m+3, . . . , 5m−3, 5m−2, 5m−1). The same interleaved programming sequence is then performed for all other layers and word lines in the block. Assuming a programming pause happens after programming the lower page LP on word-line WL1 in layer L0 (sequence index 1), the interface of layer 1 can be closed by programming the subsequent pages with dummy data up to the extra page XP on word line WLm−1 in layer L1 (sequence index 8m−2). Doing so completely programs all not yet programmed pages in layer L1 with dummy data, but also programs all lower pages in layers L2 and L3 while the upper and extra pages in layers L2 and L3 remain not programmed yet. Later on, upon programming upper and extra pages in layer L2, cell-to-cell interference is caused to the neighboring layers including layer L1. Even though all data in L1 is dummy data and hence not accessed by host reads, the interference may cause sub-optimal read voltage calibration when layer L0 and L1 are grouped together for calibration. Therefore, we call these adjacent layers "dependent layers".

Depending on the manufacturing process there may be zero or more dummy layers in between data layers. The presence of dummy layers (Ld) as shown in FIG. 2B can reduce the dependency between the boundary data layers Ln−1 and Ln. For example, a programming pause happens after the page on word line WL1 in layer Ln−1 (sequence index x) is programmed. Closing the interface of layer Ln−1 will program all remaining pages in that layer as well as the lower pages layers Ln and Ln+1. When the upper and extra pages of layer Ln are programmed, any interference on pages in layer Ln−1 will be small due to the presence of the dummy layers. Further, the phenomena such as short-term retention, etc. as described above affect lower pages significantly less, the programming of the remaining pages in layer Ln and Ln+1 as well those from layer Ln+2 will only marginally affected those already programmed lower pages. Layers Ln−1 and Ln are therefore considered independent layers. Assuring that these two layers belong to different page groups for calibration further guarantees that optimal calibration can be performed. In other words, programming pauses can be accepted without the risk of encountering the drawbacks mentioned above at the boundaries of dependent layers, namely at positions where dummy layer have been inserted, or at the end of the block, or more generally, when all pages written in a block at a particular point can no longer be influenced significantly by future page program operations in the same block. Even though different generations of NAND flash devices may use significantly different programming sequences and modes that affect the behavior of the memory cells, the concept of dependent layers can be easily applied and extended to those devices by a person skilled in the art.

Having described the general physical structure of one exemplary embodiment of a data storage system 120, certain operational aspects of data storage system 120 are now described with reference to FIG. 3, which is a high level flow diagram of the flash management functions and data structures employed by a GPP 132 and/or flash controller 140 in accordance with one embodiment.

Data storage system 120 does not generally allow external devices (e.g., hosts) to directly address and/or access the physical memory locations within NAND flash memory systems 150. Instead, data storage system 120 is generally configured to present to host devices one or more logical volumes each having a contiguous logical address space, thus allowing host devices to read and write data to and from logical block addresses (LBAs) within the logical address space while permitting one or more of the various levels of controllers (e.g., system management controller 123, RAID controllers 124, flash controllers 140 and GPP 132) to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 performs logical-to-physical address translation for an associated set of LBAs using a logical-to-physical address translation data structure, such as logical-to-physical translation (LPT) table 300, which can be stored, for example, in the associated flash controller memory 142. It should be noted that the logical address supplied to flash controller(s) 140 may be different from the logical address originally supplied to data storage system 120, since various components within data storage system 120 may perform address translation operations between the external devices and the flash controller(s) 140.

Flash management code running on the GPP 132 tracks erased blocks of NAND flash memory system 150 that are ready to be used in ready-to-use (RTU) queues 306, which may be stored, for example, in GPP memory 134. In the depicted embodiment, flash management code running on the GPP 132 maintains one RTU queue 306 per channel (i.e., per data bus), and an identifier of each erased block that is to be reused is enqueued in the RTU queue 306 corresponding to its channel. In some embodiments, blocks are individually allocated from RTU queues 306 to store data from host writes and garbage collection. In other embodiments, a build block stripes function 320 performed by flash management code running on the GPP 132 constructs new block stripes for storing data and associated parity information from the erased blocks enqueued in RTU queues 306. The new block stripes are then queued to the flash controller 140 for data placement. Block stripes, if used, are preferably formed of one or more physical blocks residing in different channels, meaning that build block stripes function 320 can conveniently construct a block stripe by drawing each block of the new block stripe from a different RTU queue 306. In general, build block stripes function 320 attempts to construct stripes from blocks of approximately equal health (i.e., expected remaining useful life). Because all of the physical block(s) composing a block stripe are generally managed together as a unit for programming and erasure, a block stripe is also referred to as a logical erase block (LEB).

In response to write request received from a host, such as a processor system 102, a data placement function 310 of flash controller 140 determines by reference to LPT table 300 whether the target LBA(s) indicated in the write request is/are currently mapped to physical memory page(s) in NAND flash memory system 150 and, if so, changes the status of each data page currently associated with a target LBA to indicate that the associated data is no longer valid. In addition, data placement function 310 allocates a page stripe if necessary to store the write data of the write request and any non-updated data (i.e., for write requests smaller than a logical page, the remaining valid data from a previous write to the same logical address which is not being overwritten and which must be handled in a read-modify-write manner) from an existing page stripe, if any, targeted by the write request, and/or stores the write data of the write request and any non-updated (i.e., still valid) data from an existing page stripe, if any, targeted by the write request to an already allocated page stripe which has free space left. The page stripe may be allocated from a block or block stripe already allocated to hold data or from a new block or block stripe. In a preferred embodiment, the page stripe allocation can be based on the health of the blocks available for allocation and the "heat" (i.e., estimated or measured write access frequency) of the LBA of the write data. Data placement function 310 then writes the write data, associated metadata (e.g., cyclic redundancy code (CRC) and error correcting code (ECC) values), and parity information for the page stripe in the allocated page stripe. Flash controller 140 also updates LPT table 300 to associate the physical page(s) utilized to store the write data with the LBA(s) indicated by the host device. Thereafter, flash controller 140 can access the data to service host read requests by reference to LPT table 300 as further illustrated in FIG. 3.

Once programming of physical pages in a block or block stripe has closed, flash controller 140 places an identifier of the block or block stripe into one of the pools in the occupied block pools 302, which flash management code running on the GPP 132 utilizes to facilitate garbage collection. As noted above, through the write process, logical pages are invalidated, and therefore portions of the NAND flash memory system 150 become unused. The associated flash controller 140 (and/or GPP 132) eventually needs to reclaim this space through garbage collection performed by a garbage collector 312. Garbage collector 312 selects particular blocks or block stripes for garbage collection based on a number of factors including, for example, the health of the physical blocks 204 and how much of the data within the physical blocks 204 is invalid. In the illustrated example, garbage collection is performed on entire block stripes, and flash management code running on GPP 132 logs identifiers of the block stripes ready to be recycled in a relocation queue 304, which can conveniently be implemented in the associated flash controller memory 142 or GPP memory 134.

The flash management functions performed by GPP 132 or flash controller 140 additionally include a relocation function 314 that relocates the data held in the source blocks or block stripes enqueued in relocation queue 304. To relocate such data, relocation function 314 issues relocation write requests to data placement function 310 to request that the valid data of the source block or block stripe be written to a new target block or block stripe in NAND flash memory system 150. In addition, relocation function 314 updates LPT table 300 to remove the current association between the logical and physical addresses of the data. Once all remaining valid data has been moved from the source block(s), any garbage collected block stripe is decomposed into its constituent physical blocks 204 by dissolve block stripes function 316, thus disassociating the physical blocks 204. Each of garbage collected physical blocks 204 from which all valid data has been moved is then erased under the direction of flash controller 140 and/or the control circuitry 205 of the relevant flash memory module 200, and a corresponding program/erase (P/E) cycle count 334 for each erased block is incremented. Based on the health metrics 332 of each erased block 204 (e.g., bit error rate (BER) metrics, uncorrectable errors, P/E cycle count, etc.), each erased block 204 is either retired (i.e., withdrawn from use) by a block retirement function 318 among the flash management functions executed on GPP 132, or alternatively, prepared for reuse by placing the block 204 on the appropriate ready-to-use (RTU) queue 306 in the associated GPP memory 134.

Figure 3:
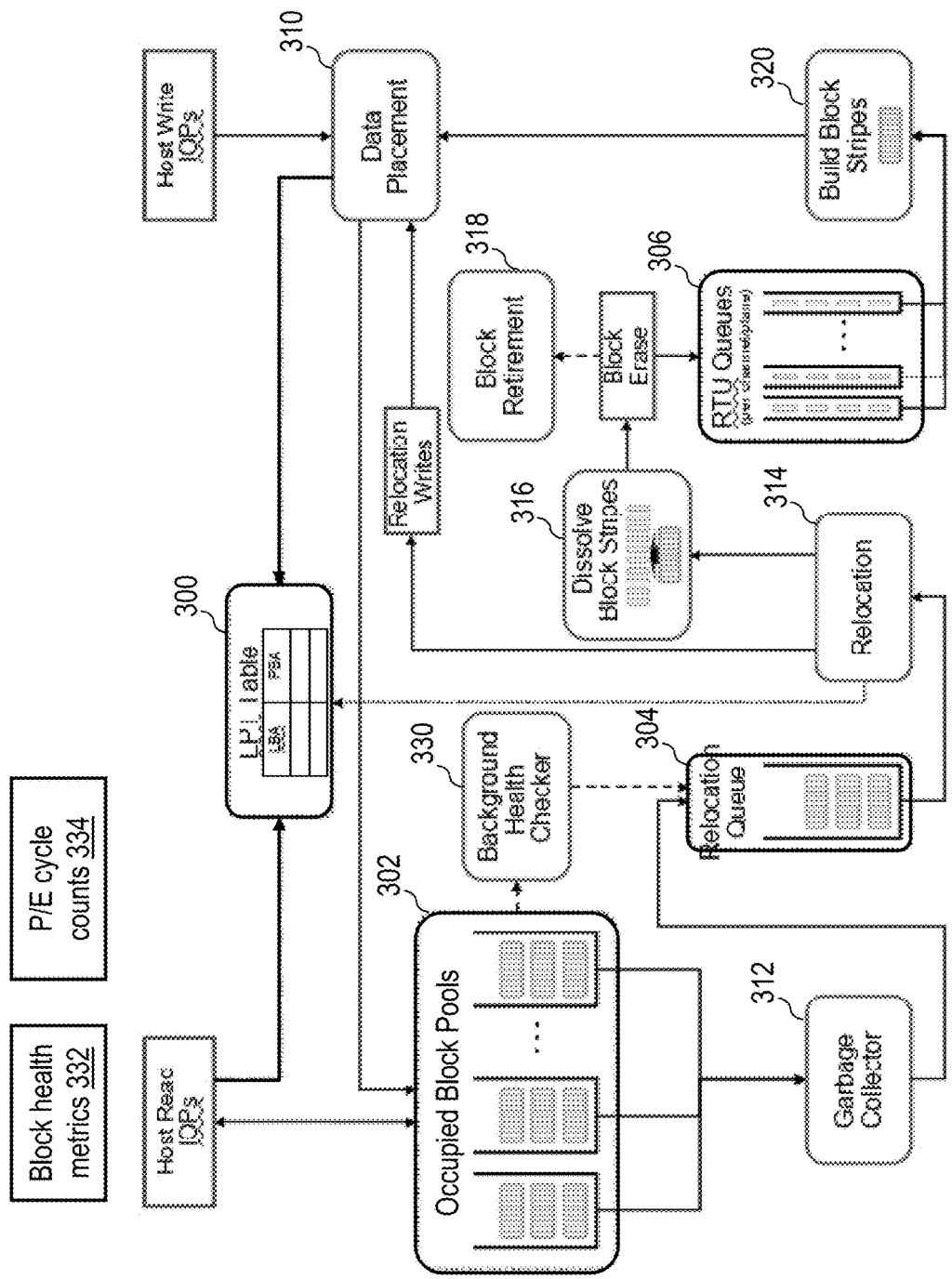
FIG. 3 is a high level flow diagram of the flash management functions and data structures employed in flash management in accordance with one embodiment.

As further shown in FIG. 3, the flash management functions executed on GPP 132 and/or flash controller 140 additionally include a background health checker 330. Background health checker 330, which operates independently of the read and write requests of hosts such as processor systems 102, continuously determines one or more block health metrics 332 for physical blocks 204 recorded in occupied block pools 302. Based on the one or more of the block health metrics 332, a wear leveling function within background health checker 330 places blocks or block stripes on relocation queue 304 for handling by relocation function 314. Key block health metrics 332 preferably monitored and recorded by background health checker 330 relate to the bit error rate (BER) metrics observed for valid blocks and physical pages, and may include, for example, the worst page BER of each block, the mean page BER of each block, the rates of change of the worst page BER and mean page BER of each block, etc. In order to obtain the most accurate health estimate possible, a health grade can be determined from an analysis of valid and invalid data, thereby ensuring that blocks containing almost entirely invalid data are fully analyzed to determine overall block health.

Figure 4:
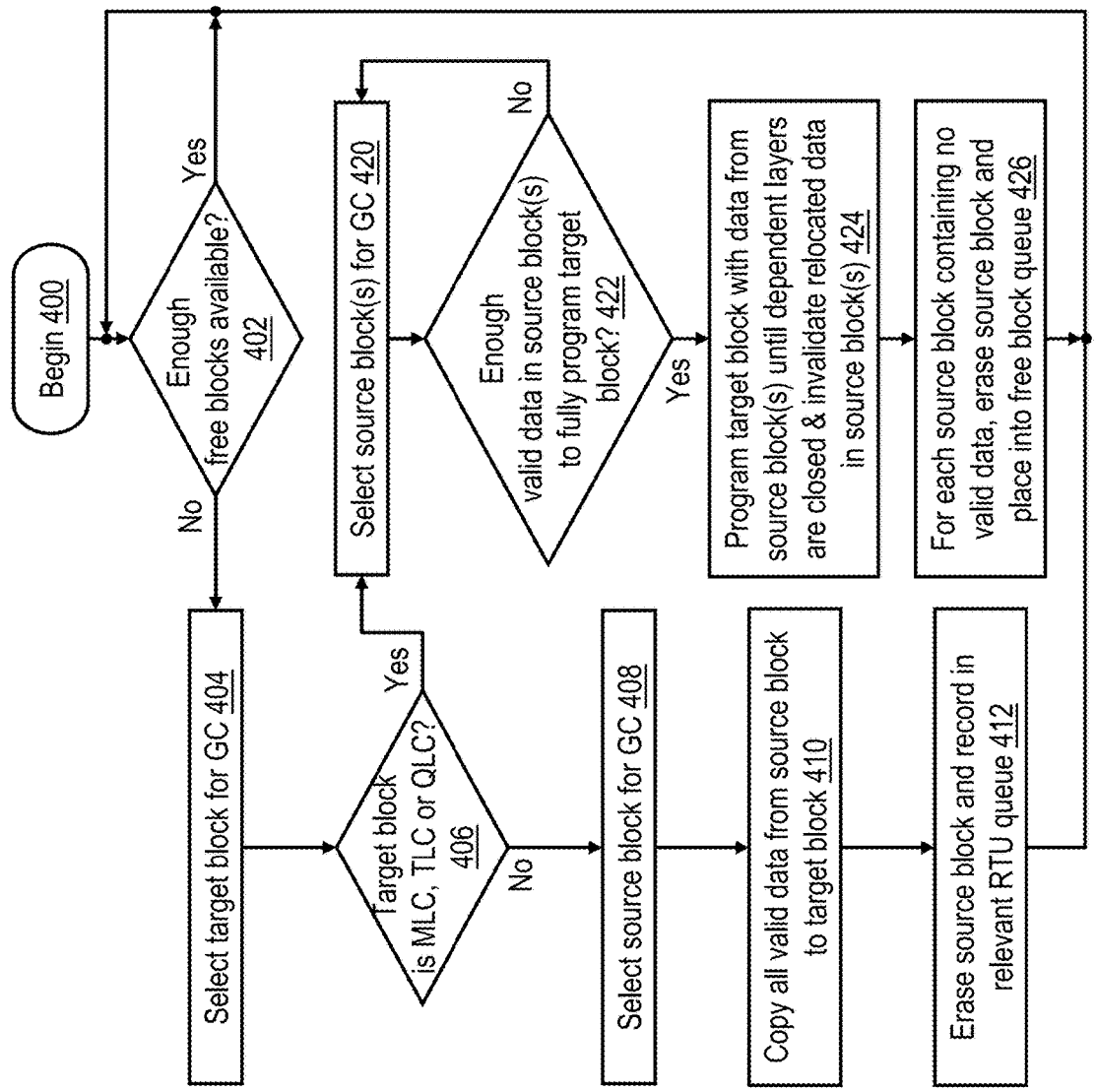
FIG. 4 is a high level logical flowchart of an exemplary process for garbage collection in accordance with one embodiment.

Referring now to FIG. 4, there is depicted a high level logical flowchart of an exemplary garbage collection process in accordance with one embodiment. In one or more implementations, the process of FIG. 4 can be performed by a controller, such as GPP 132 and/or flash controller 140, in hardware, firmware, and/or software utilizing, at least in part, a garbage collector 312. Although the garbage collection process is described as operating on individual blocks 204 of physical memory, it will be appreciated that the illustrated process is also applicable to the garbage collection of block stripes.

The process of FIG. 4 begins at block 400 and then proceeds to block 402, which depicts garbage collector 312 monitoring the fill levels of RTU queues 306 to determine whether the number of erased (free) blocks 204 recorded in each of RTU queues 306 (and/or a set of multiple RTU queues 306) satisfies (e.g., is greater than or greater than or equal to) a minimum threshold. In at least some embodiments, the determination made at block 402 can be made independently for the first pool of SLC blocks and the second pool of MLC, TLC or QLC blocks. Those skilled in the art will appreciate that the minimum threshold can be dynamically and independently varied for each RTU queue 306 by garbage collector 312 based, for example, on block health metrics 332, P/E cycles counts, write throughput of the current work load, the number of SLC blocks available, the number of MLC, TLC, and/or QLC blocks available, etc. In response to determining that the minimum threshold(s) monitored at block 402 is/are satisfied, the garbage collection process iterates at block 402.

However, in response to determining at block 402 that the minimum threshold for at least one RTU queue 306 or one of the first or second pools of blocks is not satisfied, the process proceeds from block 402 to block 404, which illustrates garbage collector 312 selecting a target block 204 into which valid data will be written by the garbage collection process. For example, at block 404, garbage collector 312 may select either an SLC block from the first pool or an MLC/TLC/QLC block from the second pool. As indicated at block 406, in response to selection of an SLC block as the target block at block 404, garbage collector 312 performs garbage collection in accordance with blocks 408-412 of FIG. 4; if, however, garbage collector 312 selects an MLC/TLC/QLC block as the target block at block 404, garbage collector 312 performs garbage collection in accordance with blocks 420-426 of FIG. 4.

Referring now to block 408, garbage collector 312 selects a source block from which valid data is to be garbage collected. The source block, which can be either a SLC block or an MLC/TLC/QLC block, can be selected by garbage collector 312 based, for example, on which RTU queues(s) 306 are lacking a sufficient number of free blocks, the block health metrics 332 of the occupied blocks 204 in the relevant channels, how much data within the occupied blocks 204 is invalid, and/or the number of free blocks 204 in each of first (i.e., SLC) and second (i.e., MLC/TLC/QLC) pools of blocks. At block 410, garbage collector 312 initiates the copying of all valid data remaining in the source block 204 to the target block 204, for example, by relocation function 314. Those skilled in the art will appreciate that if the source block 204 is an MLC/TLC/QLC block, a single SLC target block 204 may have insufficient storage capacity to hold all of the valid data remaining within the MLC/TLC/QLC source block 204. Accordingly, if necessary, garbage collector 312 may select additional SLC target block(s) 204 as necessary at block 410. As indicated at block 412, once all of the valid data is copied from the source block 204 to the target block 204 (and assuming the source block 204 is not retired), the source block 204 is erased in preparation for reuse, and its identifier is recorded in the relevant one of RTU queues 306. Following block 412, the process of FIG. 4 returns to block 402.

As depicted in blocks 408-412, because SLC blocks 204 in state-of-the-art memory technology do not suffer the same undesirable data retention-induced bit error effects as MLC/TLC/QLC blocks, garbage collector 312 preferably stops garbage collection when all valid data has been transferred from the source block 204 without regard to the whether all the interfaces at the boundary of dependent layers of the SLC target block 204 have been closed.

Referring now to block 420, if the target block 204 selected by garbage collector 312 is an MLC/TLC/QLC block rather than a SLC block 204, garbage collector 302 selects one or more source blocks 204 for garbage collection. Garbage collector 312 can select the source block(s) 204 based, for example, on which RTU queues(s) 306 are lacking a sufficient number of free blocks, the block health metrics 332 of the occupied blocks 204 in the relevant channels, how much data within the occupied blocks 204 is invalid, and/or the number of free blocks 204 in each of first (i.e., SLC) and second (i.e., MLC/TLC/QLC) pools of blocks. As indicated by the loop between blocks 420 and 422, garbage collector 312 continues to select one or more additional source blocks 204 for garbage collection until the amount of valid data to be garbage collected from the source blocks 204 is sufficient for data placement function 310 to fill the entire MLC/TLC/QLC target block 204 or to fill the target block such that all interfaces up to the boundary of a set of dependent layers are closed. As explained above, by garbage collecting sufficient valid data to fill an entire MLC/TLC/QLC target block 204 or by filling the target block 204 such that all interfaces up to the boundary of a set of dependent layers are closed, the garbage collection process will not leave any open interfaces in the target block 204, the last closed interface is at the boundary of independent layers, and there will not be any significant pauses while writing the target block 204. Consequently, read threshold voltage calibration for the constituent page groups of the target block 204 will more closely track the optimal read threshold voltage shifts for the pages in each page group, and read bit error rates for the target block 204 will be reduced.

Figure 5:
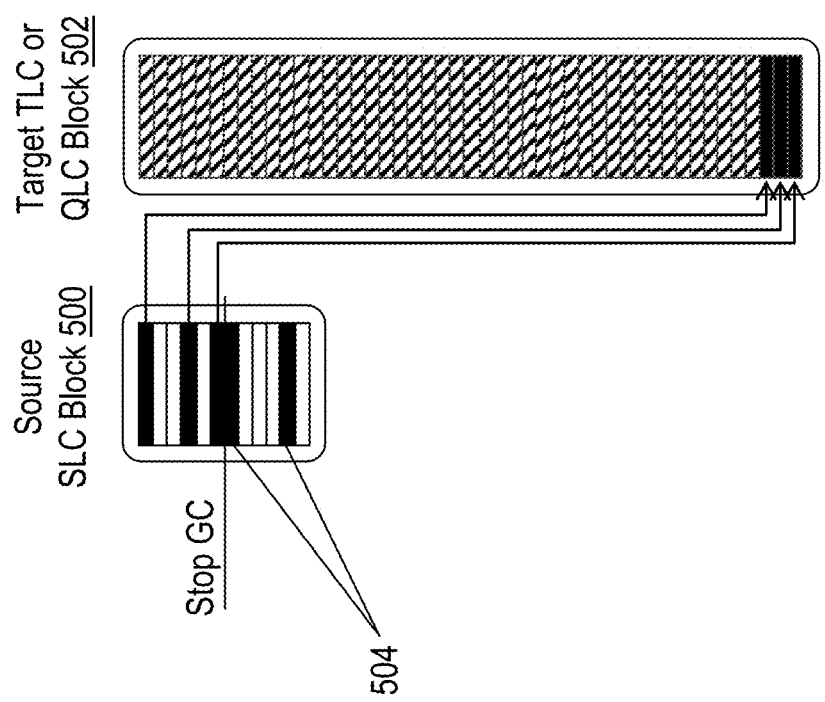
FIG. 5 illustrates a representation of a partially garbage collected source block in accordance with the garbage collection process of FIG. 4.

In response to garbage collector 312 determining at block 422 that the source block(s) identified at block 420 contain enough valid data to close all of the interfaces of the target block 204 at a boundary of independent layers, garbage collector 312 initiates the programming of pages of target block 204 with valid data from the source block(s) 204 and the invalidation, in the source block(s), of the copied data pages (block 424). Garbage collector 312 ends the programming of the target block 204 when all of the interfaces of the target block 204 are closed at the boundary of independent layers without regard to whether the source block(s) 204 still contains valid data. Consequently, as shown in FIG. 5, in a typical case in which the target block is an MLC, TLC or QLC block 502, garbage collector 312 will stop garbage collection from a source block 500 (in this case, a SLC block) when target MLC/TLC/QLC block 502 is programmed such that all the interfaces of the target block 502 are closed at the border of independent layers. Note that this includes the case where the target block 502 is completely programmed. However, the final source block 500 from which valid data is garbage collected will likely still retain one or more pages 504 of valid data.

Returning to FIG. 4, the process proceeds from block 424 to block 426, which illustrates that each source block 204 that contains no valid data pages following garbage collection is then erased in preparation for reuse (assuming that the source block 204 is not retired). The identifier of each erased source block 204 is then recorded in the relevant one of RTU queues 306. It should be noted that at least one source block 204 may still retain one or more valid data pages and, if so, will not be erased at block 426. Following block 426, the process of FIG. 4 returns to block 402, which has been described.

As has been described, in at least some embodiments, a non-volatile memory includes a plurality of blocks of physical memory, including a target block and at least one source block containing at least some valid data and some invalid data. Responsive to determining to perform garbage collection for the non-volatile memory, the controller transfers valid data from the at least one source block to the target block. The controller ends garbage collection on the at least one source block with at least some valid data present in the at least one source block and all interfaces of the target block closed at the boundary of independent layers. In at least some embodiments, the target block may be configured to store more bits per cell than the at least one source block.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

In addition, although embodiments have been described that include use of a NAND flash memory, it should be appreciated that embodiments of the present invention can also be used with any other type of non-volatile random access memory (NVRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of garbage collection in a non-volatile memory including a plurality of blocks of physical memory, said plurality of blocks of physical memory including a target block and further including at least one source block containing at least some valid data and some invalid data, the method comprising:
a controller, based on determining to perform garbage collection for the non-volatile memory:
transferring valid data from the at least one source block to the target block; and
ending garbage collection on the at least one source block with at least some valid data present in the at least one source block and the target block only partially filled based on all interfaces of the target block being closed at a boundary of independent physical layers within the non-volatile memory.

2. The method of claim 1, wherein the target block is configured to store more bits per cell than the at least one source block.

3. The method of claim 2, wherein the at least one source block comprises a plurality of source blocks.

4. The method of claim 1, wherein:
ending garbage collection comprises ending garbage collection on the at least one source block with at least some valid data present in the at least one source block and the target block only partially filled based on all interfaces of the target block being closed at the boundary of independent physical layers and the target block being configured to store multiple bits per cell; and
the method further comprises:
based on the target block being configured to store a single bit per cell, ending garbage collection on the at least one source block when all valid data in the at least one source block has been copied to the target block.

5. The method of claim 1, and further comprising:
initiating garbage collection on the at least one source block only based on the at least one source block including sufficient valid to close all interfaces of the target block at the boundary of the independent physical layers.

6. A data storage system, comprising:
a controller for a non-volatile memory including a plurality of blocks of physical memory, said plurality of blocks of physical memory including a target block and at least one source block containing at least some valid data and some invalid data, wherein the controller is configured to perform:
based on determining to perform garbage collection for the non-volatile memory:
transferring valid data from the at least one source block to the target block; and
ending garbage collection on the at least one source block with at least some valid data present in the at least one source block and the target block only partially filled based on all interfaces of the target block being closed at a boundary of independent physical layers within the non-volatile memory.

7. The data storage system of claim 6, wherein the target block is configured to store more bits per cell than the at least one source block.

8. The data storage system of claim 7, wherein the at least one source block comprises a plurality of source blocks.

9. The data storage system of claim 6, wherein:
ending garbage collection comprises ending garbage collection on the at least one source block with at least some valid data present in the at least one source block and the target block only partially filled based on all interfaces of the target block being closed at the boundary of independent physical layers and the target block being configured to store multiple bits per cell; and
the controller is further configured to perform:
based on the target block being configured to store a single bit per cell, ending garbage collection on the at least one source block when all valid data in the at least one source block has been copied to the target block.

10. The data storage system of claim 6, wherein the controller is further configured to perform:
initiating garbage collection on the at least one source block only based on the at least one source block including sufficient valid to close all interfaces of the target block at the boundary of the independent physical layers.

11. The data storage system of claim 6, and further comprising the non-volatile memory.

12. A computer program product, the computer program product comprising a computer readable storage medium having program instructions embodied therewith, the program instructions being executable by a controller of a non-volatile memory to cause the controller to perform:
based on determining to perform garbage collection for at least one source block of the non-volatile memory, the at least one source block containing at least some valid data and some invalid data:
transferring valid data from the at least one source block to a target block of the non-volatile memory; and
ending garbage collection on the at least one source block with at least some valid data present in the at least one source block and the target block only partially filled based on all interfaces of the target block being closed at a boundary of independent physical layers within the non-volatile memory.

13. The program product of claim 12, wherein the target block is configured to store more bits per cell than the at least one source block.

14. The program product of claim 13, wherein the at least one source block comprises a plurality of source blocks.

15. The program product of claim 12, wherein:
ending garbage collection comprises ending garbage collection on the at least one source block with at least some valid data present in the at least one source block and the target block only partially filled based on all interfaces of the target block being closed at the boundary of independent physical layers and the target block being configured to store multiple bits per cell; and
the program instructions, when executed, cause the controller to perform:
based on the target block being configured to store a single bit per cell, ending garbage collection on the at least one source block when all valid data in the at least one source block has been copied to the target block.

16. The program product of claim 12, wherein the program instructions, when executed, cause the controller to perform:

initiating garbage collection on the at least one source block only based on the at least one source block including sufficient valid to close all interfaces of the target block at the boundary of the independent physical layers.

* * * * *